(12) United States Patent
Yamamoto (10) Patent No.: US 10,771,693 B2
(45) Date of Patent: Sep. 8, 2020

(54) IMAGING APPARATUS, CONTROL METHOD FOR IMAGING APPARATUS, AND STORAGE MEDIUM

(71) Applicant: CANON KABUSHIKI KAISHA, Tokyo (JP)

(72) Inventor: Naohiro Yamamoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 16/121,428

(22) Filed: Sep. 4, 2018

(65) Prior Publication Data

US 2019/0082105 A1 Mar. 14, 2019

(30) Foreign Application Priority Data

Sep. 14, 2017 (JP) .................. 2017-176622

(51) Int. Cl.
| | |
|---|---|
| *G06K 7/14* | (2006.01) |
| *H04N 5/232* | (2006.01) |
| *H04N 5/247* | (2006.01) |
| *G06T 7/292* | (2017.01) |
| *H04N 5/268* | (2006.01) |
| *G06T 3/40* | (2006.01) |
| *H04N 5/225* | (2006.01) |
| *H04N 5/445* | (2011.01) |

(52) U.S. Cl.
CPC ....... *H04N 5/23238* (2013.01); *G06T 3/4038* (2013.01); *G06T 7/292* (2017.01); *H04N 5/2258* (2013.01); *H04N 5/23206* (2013.01); *H04N 5/23216* (2013.01); *H04N 5/23299* (2018.08); *H04N 5/247* (2013.01); *H04N 5/268* (2013.01); *G06T 2207/30232* (2013.01); *H04N 5/23296* (2013.01); *H04N 5/44504* (2013.01)

(58) Field of Classification Search
CPC ............. H04N 5/23238; H04N 5/2258; H04N 5/23216; H04N 5/268; H04N 5/23206; H04N 5/23299; H04N 5/247; H04N 5/44504; H04N 5/23296; H04N 7/181; H04N 5/23203; G06T 3/4038; G06T 7/292; G06T 2207/30232
See application file for complete search history.

(56) References Cited

U.S. PATENT DOCUMENTS

| | | | |
|---|---|---|---|
| 9,485,425 B1 * | 11/2016 | Swift | H04N 5/23241 |
| 2014/0247323 A1 * | 9/2014 | Griffis | H04N 5/2259 |
| | | | 348/36 |
| 2015/0244989 A1 * | 8/2015 | Liao | H04N 5/247 |
| | | | 348/159 |
| 2015/0271455 A1 * | 9/2015 | Yuan | H04N 7/188 |
| | | | 348/231.99 |

(Continued)

FOREIGN PATENT DOCUMENTS

JP 2008-90145 A 4/2008

*Primary Examiner* — Howard D Brown, Jr.
(74) *Attorney, Agent, or Firm* — Canon U.S.A., Inc. IP Division (57) ABSTRACT

An image captured by a camera having a fixed imaging range and an image captured by a camera capable of changing an imaging range are appropriately distributed. An imaging apparatus includes a plurality of first imaging units, a second imaging unit configured to be capable of changing an imaging range, and a distribution unit configured to distribute a plurality of first captured images in a sequence based on a region.

8 Claims, 9 Drawing Sheets

(56) References Cited

U.S. PATENT DOCUMENTS

2015/0294483 A1* 10/2015 Wells .................. G06T 7/292
                                                    382/103
2016/0088326 A1*  3/2016 Solomon ............ H04N 7/181
                                                    725/12
2016/0292484 A1* 10/2016 Hachimura ...... G06K 19/06037

* cited by examiner

IMAGING APPARATUS, CONTROL METHOD FOR IMAGING APPARATUS, AND STORAGE MEDIUM

BACKGROUND

Field

The present invention relates to a scheme for distributing, on a network, a plurality of images captured by a plurality of imaging elements.

Description of the Related Art

A system of a network camera for monitoring a person such as an intruder in an off-limits area is known. Examples of the off-limits area include public buildings and sites, banks, stores such as supermarkets, dams, bases, and airports. As a camera used for such a system, an apparatus is known which has a mechanism configured by combining an omnidirectional camera and a pan-tilt-zoom (PTZ) camera. The omnidirectional camera acquires an omnidirectional image by installing a plurality of imaging elements at predetermined positions, and combining images captured by the respective imaging elements in a predetermined imaging range. The PTZ camera has a pan-tilt-zoom mechanism, and can change an imaging range. In the apparatus in which the omnidirectional camera and the PTZ camera are combined, it is possible to distribute a video image obtained by imaging a specific range by using the PTZ camera, while distributing a video image captured by the omnidirectional camera. In this case, the apparatus distributes a plurality of video images obtained by the respective cameras to a network while switching the video images in a fixed sequence. Further, in such an apparatus, when a user specifies a desired range in an omnidirectional image, the desired range is imaged while the pan-tilt-zoom mechanism of the PTZ camera operates in an interlocking manner. A video image obtained by the imaging can be distributed.

Meanwhile, Japanese Patent Application Laid-Open No. 2008-90145 discusses a related technology. According to the technology, in a case where images captured by a plurality of cameras are synthesized to generate a wide image, a center region is imaged and then, a surrounding imaging region is imaged in a spiral manner.

As described above, there is an apparatus that sequentially distributes, to a network, images, which are captured by a camera having a fixed imaging range and a camera capable of changing an imaging region such as the PTZ camera. Such an apparatus is expected to update a video image of a region specified by a user without delay. However, the video image of the specified region is distributed later than another video image, whereby there is an issue that updating of the image of the specified region is late.

SUMMARY OF THE INVENTION

According to an aspect of the present invention, an imaging apparatus includes a plurality of first imaging units configured to image respective imaging ranges different from each other, an accepting unit configured to accept specification of a region overlapping the imaging range of at least one of the plurality of first imaging units, a second imaging unit configured to be capable of changing an imaging range, the second imaging unit being configured to perform control for imaging a region based on the specification accepted by the accepting unit, and a distribution unit configured to distribute a plurality of first captured images in a sequence based on the region, in distributing to an external apparatus the plurality of first captured images captured by the respective first imaging units and a second captured image captured by the second imaging unit.

Further features of the present invention will become apparent from the following description of exemplary embodiments with reference to the attached drawings.

DESCRIPTION OF THE EMBODIMENTS

Figure 1:
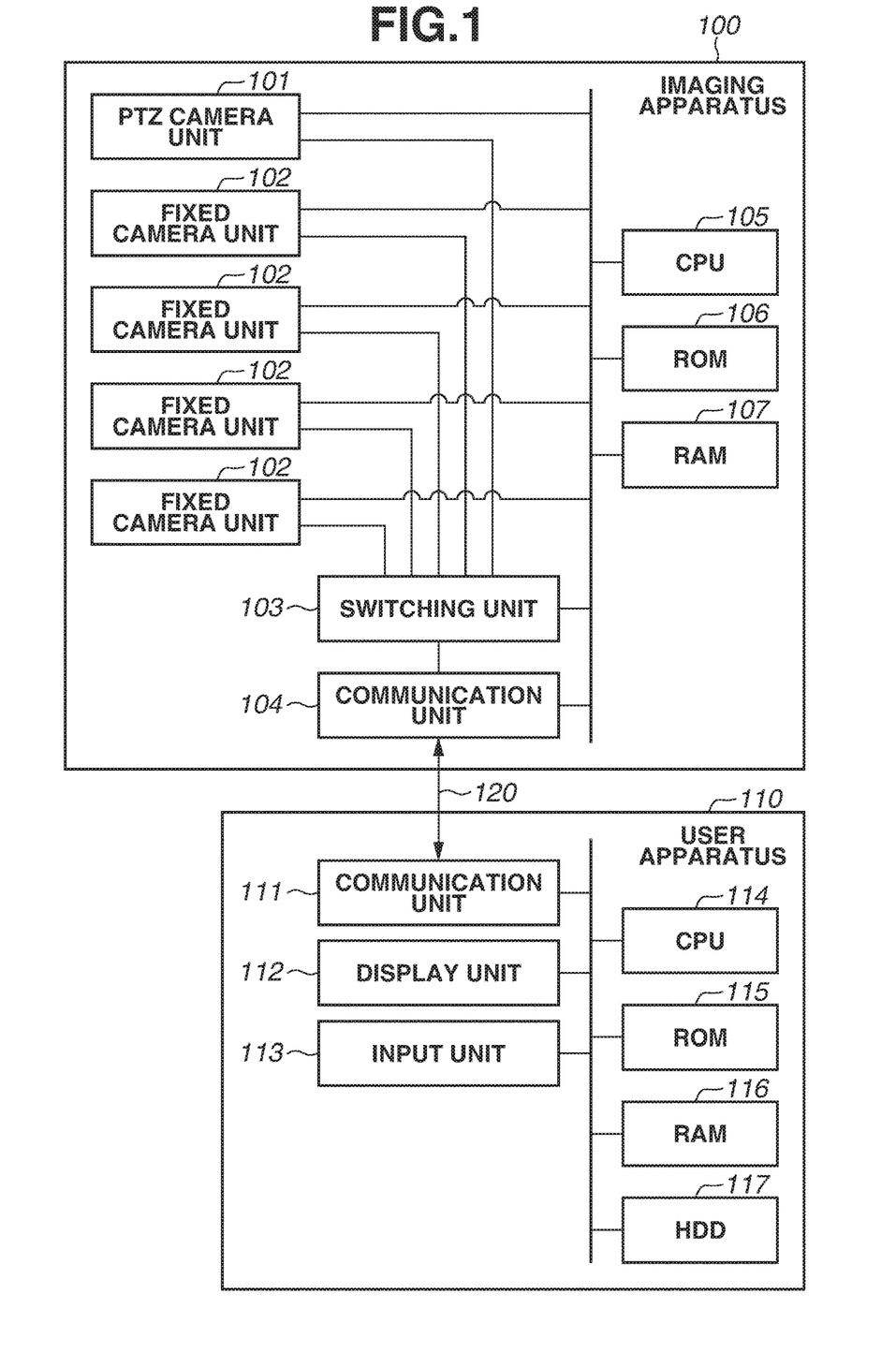
FIG. 1 is a schematic diagram illustrating a functional configuration of an imaging system.

FIG. 1 is a diagram illustrating an imaging system according to a first exemplary embodiment. The imaging system has an imaging apparatus 100 and a user apparatus 110. The imaging apparatus 100 and the user apparatus 110 are connected via a network 120. The imaging apparatus 100 captures an image of a monitoring region, and transmits the captured image to the user apparatus 110. The user apparatus 110 receives the captured image from the imaging apparatus 100 and displays the received image. In the present exemplary embodiment, the captured image is a video image, but may be a still image.

The imaging apparatus 100 includes a pan-tilt-zoom (PTZ) camera unit 101, four fixed camera units 102, a switching unit 103, and a communication unit 104. The number of the fixed camera units 102 included in the imaging apparatus 100 is not limited to the number in the present exemplary embodiment. The imaging apparatus 100 only needs to have two or more fixed camera units 102. The imaging apparatus 100 further includes a central processing unit (CPU) 105, a read only memory (ROM) 106, and a random access memory (RAM) 107.

The PTZ camera unit 101 is a camera which has a zoom lens and an imaging element, and can perform control of panning, tilting, and zooming. In other words, the PTZ camera unit 101 can change an imaging range. The PTZ camera unit 101 controls the zoom lens and a drive motor, according to a control instruction received from the user apparatus 110. Here, the PTZ camera unit 101 is an example of an imaging unit capable of changing an imaging range. The control of panning, tilting, and zooming will be hereinafter referred to as PTZ control. Meanwhile, each of the fixed camera units 102 has a fixed lens and an imaging element. The fixed camera units 102 are each installed at a predetermined position (see FIG. 2) and images a fixed imaging range to obtain an omnidirectional image by synthesis. The imaging element of each of the PTZ camera unit 101 and the fixed camera units 102 performs conversion into an image electrical signal according to light. Examples of the imaging element include a charge-coupled device (CCD) sensor and a complementary metal oxide semiconductor (CMOS) sensor.

A plurality of images captured by the respective fixed camera units 102 are synthesized, and one omnidirectional image (a panoramic image) is thereby generated and displayed, in the user apparatus 110. The imaging ranges of the respective fixed camera units 102 are different. Here, that the imaging ranges are different include a case where the imaging ranges only partially overlap.

The switching unit 103 is connected to each of the PTZ camera unit 101 and the fixed camera units 102. The switching unit 103 selects one from among the captured images of the PTZ camera unit 101 and the fixed camera units 102, according to a distribution order (a distribution sequence) of the captured images of the PTZ camera unit 101 and the fixed camera units 102. The switching unit 103 then transmits the selected image to the communication unit 104. The communication unit 104 transmits and receives information via the network 120. For example, the communication unit 104 compresses a captured image and distributes the compressed image to the user apparatus 110 via the network 120.

The CPU 105 executes various kinds of processing by reading out a control program stored in the ROM 106. The RAM 107 is used as a main memory of the CPU 105, or a temporary storage area such as a work area. The CPU 105 reads out the program stored in the ROM 106 and executes the program to implement a function and processing to be described below, of the imaging apparatus 100. In another example, the CPU 105 may read out a program stored in a storage medium such as a secure digital (SD) card in place of the ROM 106.

The user apparatus 110 is, for example, an information processing apparatus such as a personal computer (PC). The user apparatus 110 includes a communication unit 111, a display unit 112, an input unit 113, a CPU 114, a ROM 115, a RAM 116, and a hard disk drive (HDD) 117. The communication unit 111 transmits and receives information via the network 120. The display unit 112 displays various kinds of information. The input unit 113 has a keyboard and mouse, and accepts various operations to be performed by a user.

The CPU 114 executes various kinds of processing by reading out a control program stored in the ROM 115. The RAM 116 is used as a main memory of the CPU 114, or a temporary storage area such as a work area. The HDD 117 stores various kinds of data and various programs. The CPU 114 reads out a program stored the ROM 115 or the HDD 117 and executes the program, thereby implementing a function and processing to be described below, of the user apparatus 110. In another example, the CPU 114 may read out a program stored in a storage medium such as an SD card in place of the ROM 115.

Figure 2:
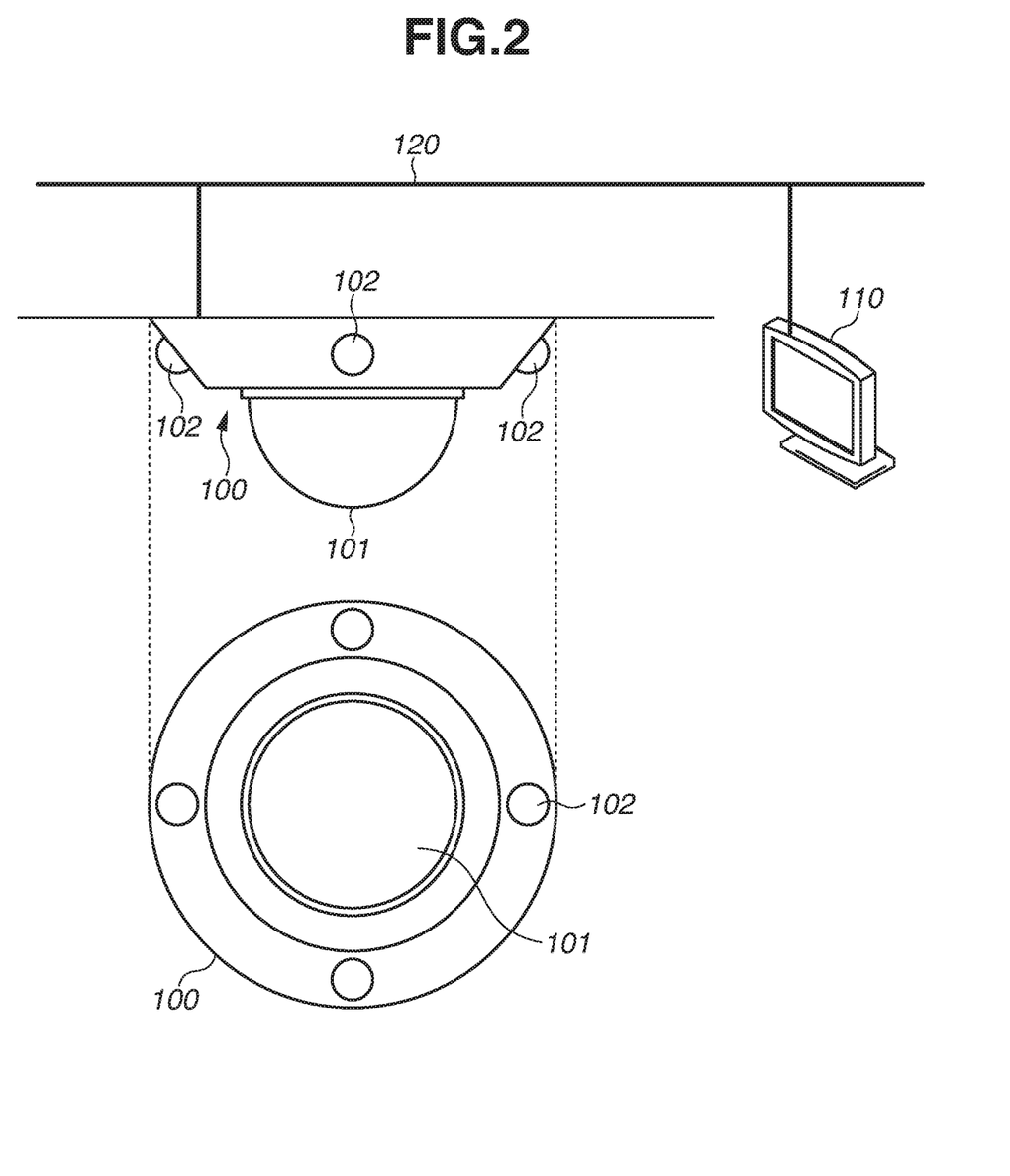
FIG. 2 is a diagram illustrating the imaging system.

FIG. 2 is an overall view of each of the imaging apparatus 100 and the user apparatus 110. The imaging apparatus 100 is installed on a ceiling. The fixed camera units 102 are installed at certain spacing in a circumferential direction (corresponding to a tilt direction of the PTZ camera unit 101) in order to perform omnidirectional imaging. Further, the PTZ camera unit 101 is installed at the center to be surrounded by the fixed camera units 102.

Figure 3:
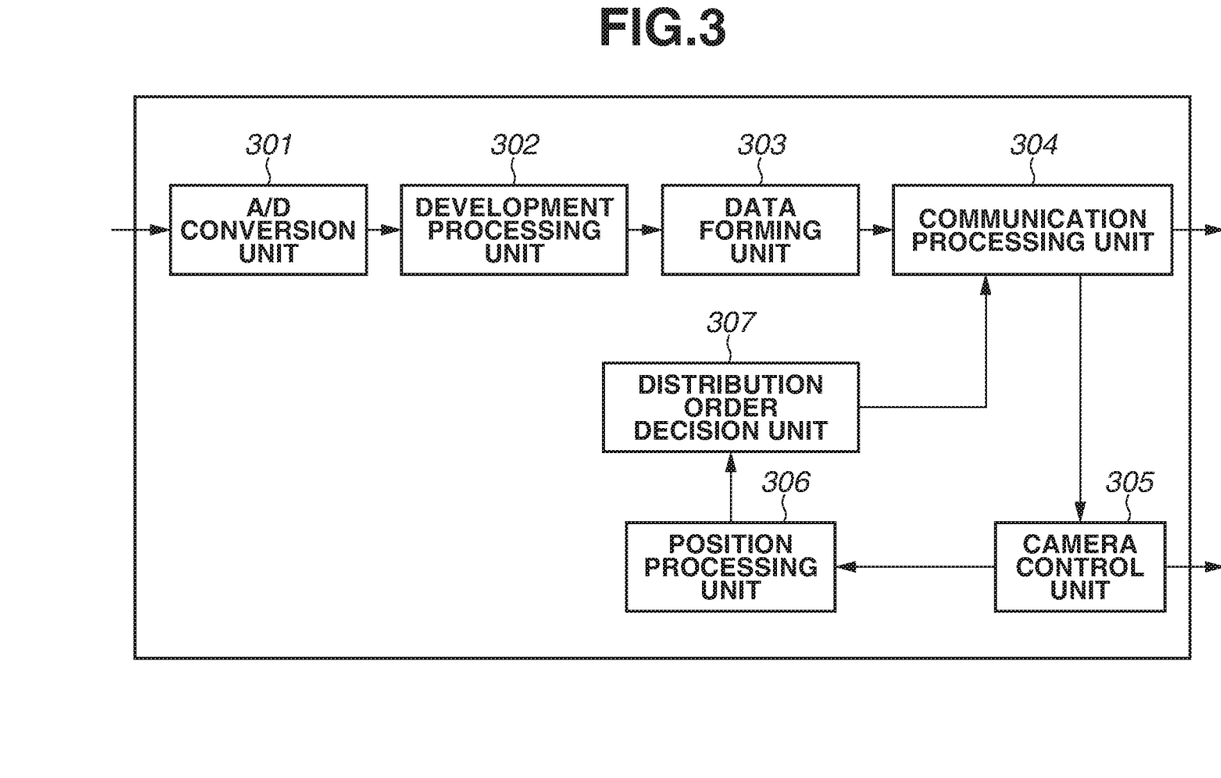
FIG. 3 is a schematic diagram illustrating a functional configuration or an imaging apparatus.

FIG. 3 is a diagram illustrating a functional configuration of the imaging apparatus 100. The imaging apparatus 100 includes an analog-to-digital (A/D) conversion unit 301, a development processing unit 302, a data forming unit 303, a communication processing unit 304, a camera control unit 305, a position processing unit 306, and a distribution order decision unit 307. The A/D conversion unit 301 obtains a captured image by performing analog-to-digital conversion on a signal received by the imaging element of each of the PTZ camera unit 101 and the fixed camera units 102. The development processing unit 302 performs development processing on the captured image obtained by the A/D conversion unit 301, and then the data forming unit 303 performs image formation for the captured image. The captured image is then transmitted to the communication processing unit 304. The communication processing unit 304 controls communication going through the network 120. The camera control unit 305 receives a camera control command via the communication processing unit 304. The camera control command is input into the user apparatus 110 by a user operation. Subsequently, the camera control unit 305 controls imaging of each of the PTZ camera unit 101 and the fixed camera units 102, according to the control command. The processing is an example of imaging control processing. The camera control unit 305 also performs the PTZ control for the PTZ camera unit 101.

The position processing unit 306 identifies an imaging position of each of the PTZ camera unit 101 and the fixed camera units 102. From the PTZ camera unit 101, the position processing unit 306 identifies an imaging position resulting from execution of the PTZ control. The distribution order decision unit 307 decides a distribution order to be used when the communication processing unit 304 distributes a plurality of images captured by the PTZ camera unit 101 and the fixed camera units 102 to the user apparatus 110.

Figure 4:
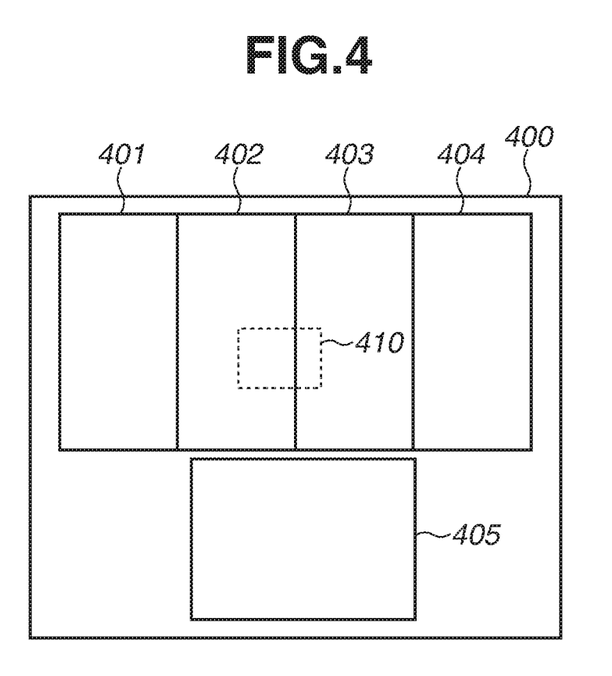
FIG. 4 is a diagram illustrating a display screen example.

FIG. 4 is a diagram illustrating a display screen example displayed at the display unit 112 of the user apparatus 110. A display screen 400 includes five regions for displaying captured images. The four consecutive regions 401 to 404 consecutively display a plurality of images captured by the respective fixed camera units 102. Here, for convenience of description, the four fixed camera units 102 in FIG. 1 will be referred to as a fixed camera unit A, a fixed camera unit B, a fixed camera unit C, and a fixed camera unit D. The four regions 401 to 404 display images captured by the fixed camera units A to D, respectively. The four captured images are placed in the consecutive regions 401 to 404, and a continuous image (an omnidirectional image) as a whole is thereby formed.

An image captured by the PTZ camera unit 101 is displayed in the region 405. Further, the user can specify a region that the user wants to focus attention on, in the captured image displayed in each of the regions 401 to 404, by operating the input unit 113. The region specified according to the user operation will be hereinafter referred to as a specified region. FIG. 4 illustrates a case where a region straddling the border between the regions 402 and 403 is specified by a specification frame 410. In this case, the PTZ mechanism of the PTZ camera unit 101 is controlled in such a manner that the region specified by the specification frame 410 is an imaging range. A captured image corresponding to the region specified by the specification frame 410 is displayed in the region 405, as the captured image of the PTZ camera unit 101.

Figure 5:
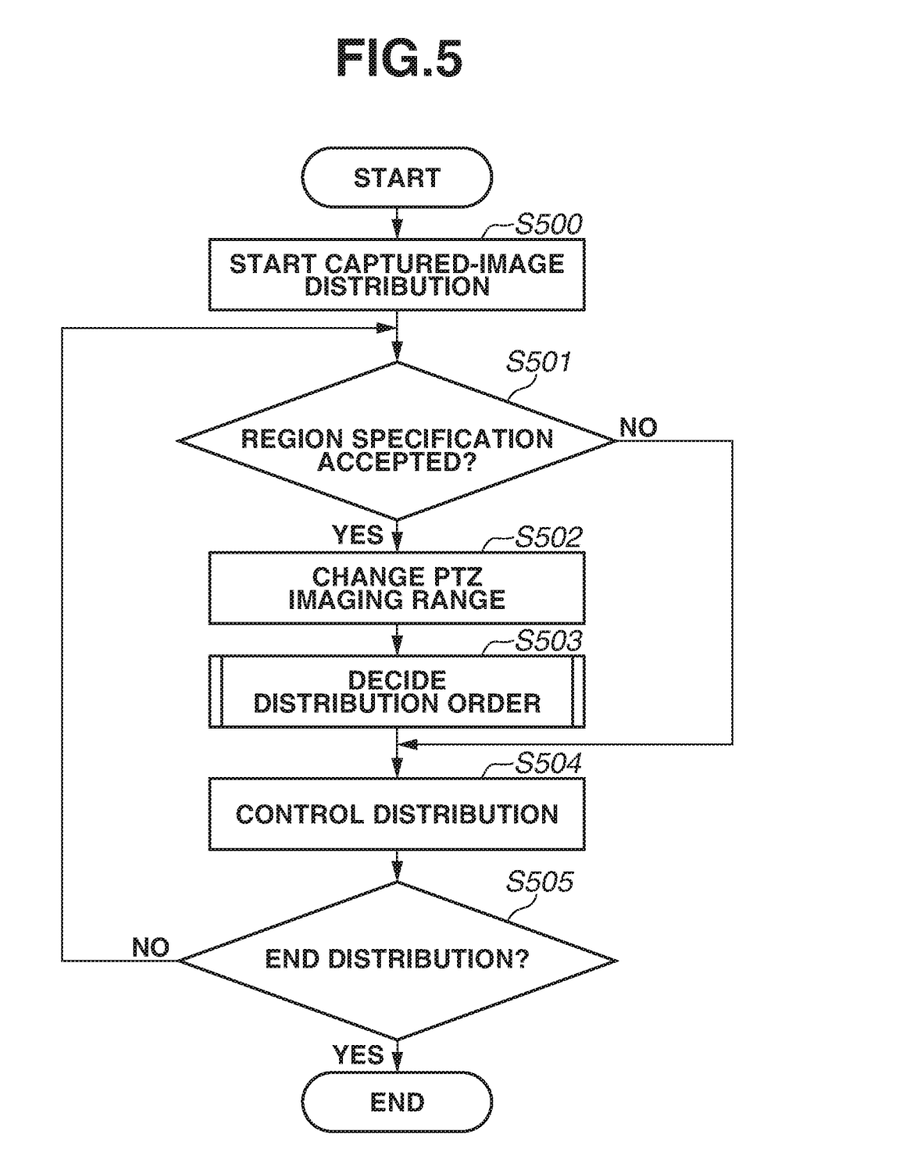
FIG. 5 is a flowchart illustrating processing for distributing a captured image.

FIG. 5 is a flowchart illustrating processing for distributing an image captured by the imaging apparatus 100. In step S500, the communication processing unit 304 of the imaging apparatus 100 performs control to start distribution of images captured by the PTZ camera unit 101 and the fixed camera units 102, via the communication unit 104. As described above, the communication processing unit 304 controls the switching unit 103 to distribute the captured images sequentially one by one. Accordingly, the communication unit 104 sequentially distributes the captured images. At the time of the start of distribution, the communication processing unit 304 performs control to distribute the captured images according to a default distribution order. The default distribution order is set beforehand in a memory such as the ROM 106 of the imaging apparatus 100. In the imaging apparatus 100, a distribution order of the captured images of, for example, the PTZ camera unit 101 and the fixed camera units A to D in this order, is set beforehand as the default. After the start of distribution, the communication processing unit 304 performs control to keep distributing the captured images sequentially while switching the captured images periodically according to the distribution order, by controlling the switching unit 103. Accordingly, the user apparatus 110 sequentially receives the captured images from the imaging apparatus 100. The user apparatus 110 displays the captured images in the regions 401 to 405 of the display screen 400 (FIG. 4), in the order in which the captured images arrive. The user apparatus 110 updates display each time a new captured image arrives.

Next, in step S501, the communication processing unit 304 confirms whether the specification of a region within the imaging range of the fixed camera unit 102 is accepted. Assume that, in the user apparatus 110, the specification frame 410 is specified by the user operation as described with reference to FIG. 4. In this case, the user apparatus 110 identifies a specified region corresponding to the specification frame 410, and transmits to the imaging apparatus 100 a control command assuming the specified region to be the imaging range of the PTZ camera unit 101. When receiving the control command, the communication processing unit 304 determines that the specification of a region is accepted. This is an example of processing for accepting specification of a region. When the communication processing unit 304 determines that the specification of a region is accepted (YES in step S501), the processing proceeds to step S502. When the communication processing unit 304 determines that the specification of a region is not accepted (NO in step S501), the processing proceeds to step S504.

In step S502, the camera control unit 305 changes the imaging range (referred to as a PTZ imaging range) of the PTZ camera unit 101, based on the control command corresponding to the specified region. In this process, the camera control unit 305 calculates the coordinate information about a PTZ imaging position for an omnidirectional image synthesized from the captured images of the four fixed camera units 102. This calculation of the coordinate information about the PTZ imaging position is implemented by assigning coordinates assuming that the omnidirectional image is one plane, and reassigning coordinates with respect to a coordinate axis of the omnidirectional image, from the position of the specification frame specified by the user. The PTZ camera unit 101 moves the camera position according to the coordinates of the change position, under the control of the camera control unit 305. Next, in step S503, the distribution order decision unit 307 decides a distribution order of a plurality of images captured by the PTZ camera unit 101 and the fixed camera units 102 (five captured images in the present exemplary embodiment). This process will be described below with reference to drawings including FIG. 6.

Next, in step S504, in a case where the distribution is decided in step S503, the communication processing unit 304 controls the switching unit 103 to distribute the images captured by the PTZ camera unit 101 and the fixed camera units 102 sequentially in the decided distribution order. Accordingly, the switching unit 103 distributes the captured images in the distribution order. In a case where the distribution order is not decided, the communication processing unit 304 performs control to distribute the captured images sequentially in the default distribution order. Accordingly, the communication unit 104 sequentially distributes the captured images to the user apparatus 110 serving as an external apparatus, according to the distribution order. Next, in step S505, the communication processing unit 304 determines whether to end the distribution. If the communication processing unit 304 determines to end the distribution (YES in step S505), the distribution processing ends. If the communication processing unit 304 determines not to end the distribution (NO in step S505), the processing proceeds to step S501 to continue the distribution. The captured images are sequentially transmitted to the user apparatus 110 by the above-described processing. Accordingly, video images are displayed and updated in the display screen 400, according to the distribution order.

Figure 6:
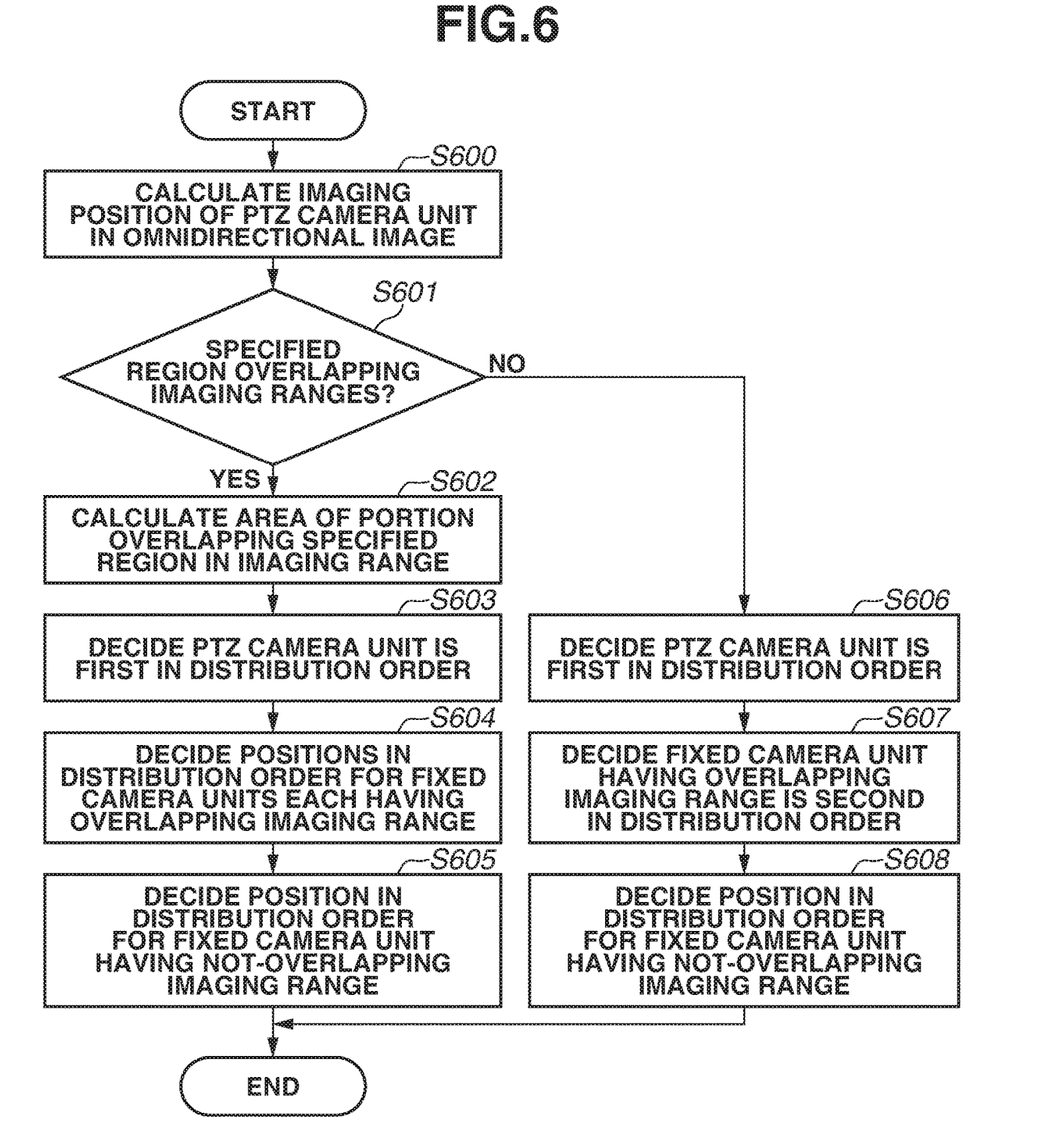
FIG. 6 is a flowchart illustrating distribution order decision processing.

FIG. 6 is a flowchart illustrating details of the distribution order decision processing (step S503). In step S600, the position processing unit 306 calculates the imaging position of the PTZ camera unit 101 in the omnidirectional image. Next, in step S601, the distribution order decision unit 307 confirms whether the specified region identified by the position processing unit 306 overlaps the imaging range of each of the fixed camera units 102. For example, in the example illustrated in FIG. 4, the specification frame 410 overlaps the two regions 402 and 403. In this case, the distribution order decision unit 307 determines that the specified region overlaps a plurality of imaging ranges. If the distribution order decision unit 307 determines that the specified region overlaps a plurality of imaging ranges (YES in step S601), the processing proceeds to step S602. If the distribution order decision unit 307 determines that the specified region does not overlap a plurality of imaging ranges (NO in step S601), i.e., if the specified region overlaps only one imaging region, the processing proceeds to step S606.

In step S602, the distribution order decision unit 307 identifies the number of imaging ranges overlapping the specified region, and which imaging range overlaps the specified region. Further, the distribution order decision unit 307 calculates the area of a portion overlapping the specified region, in each of the plurality of imaging ranges overlapping the specified region, thereby identifying an overlap-area descending order. Next, in step S603, the distribution order decision unit 307 decides that the captured image of the PTZ camera unit 101 is the first in the distribution order. Next, in step S604, the distribution order decision unit 307 decides the second and thereafter in the distribution order in an overlap-area descending order, for the fixed camera units 102 each having the imaging range overlapping the specified region.

Next, in step S605, for the fixed camera units 102 each having the imaging range not overlapping the specified region, the distribution order decision unit 307 decides positions in the distribution order, based on a positional relationship with the specified region. These positions follow the positions in the distribution order decided for the fixed camera units 102 each having the imaging range overlapping the specified region.

Specifically, the distribution order decision unit 307 assigns an earlier position to the fixed camera unit 102 having the imaging range closer to the specified region. As a result, for example, in the example illustrated in FIG. 4, the distribution order is decided in such a manner that the PTZ camera unit 101, the fixed camera unit B corresponding to the region 402, the fixed camera unit C corresponding to the region 403, the fixed camera unit A corresponding to the region 401, and the fixed camera unit D corresponding to the region 404 are arranged in this order.

In step S606, the distribution order decision unit 307 decides that the PTZ camera unit 101 is the first in the distribution order. Next, in step S607, the distribution order decision unit 307 decides that the fixed camera unit 102 having the imaging range overlapping the specified region is the second in the distribution order. Next, in step S608, for the fixed camera units 102 each having the imaging range not overlapping the specified region, the distribution order decision unit 307 decides the third and thereafter in the distribution order, based on a positional relationship with the specified region. Step S608 is similar to step S605. The distribution order decision processing is performed to decide an order of distributing the captured images of the fixed camera units 102, based on the degree of an overlap and the presence or absence of an overlap between the imaging range of the fixed camera unit 102 and the specified region. In other words, the distribution order decision processing is an example of processing for deciding a captured-image distribution order, based on a positional relationship between an imaging range and a specified region. The distribution order decision unit 307 only needs to decide the distribution order, based on the positional relationship between the imaging range and the specified region, and specific processing for this purpose is not limited to the above-described processing. For example, the distribution order decision unit 307 may determine which fixed camera unit 102 has an imaging range, to which an upper left portion (the start position of a dragging operation performed by the user) of the specified region belongs. The distribution order decision unit 307 may then decide a position in the distribution order for this captured image. Further, the frame rate of the fixed camera unit 102 having priority may be raised to be higher than those of the other fixed camera units 102.

As describe above, the imaging apparatus 100 of the present exemplary embodiment can distribute the captured image overlapping the specified region in preference to other captured images. In this way, the imaging apparatus 100 can appropriately distribute an image captured by a camera having a fixed imaging range and an image captured by a camera capable of changing an imaging range. In addition, it is possible to prevent the loss of a captured image of a region on which the attention of the user is focused.

Figure 7:
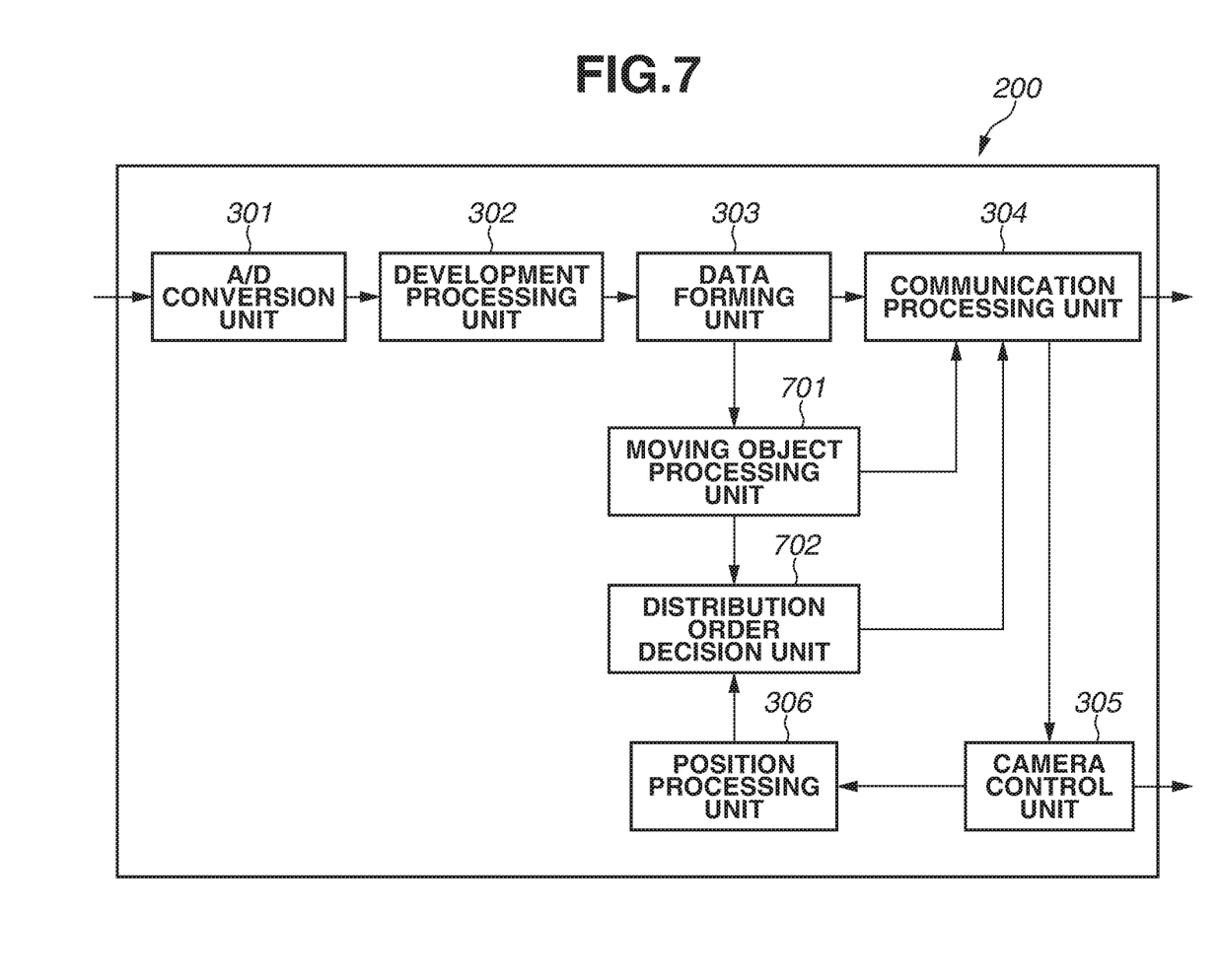
FIG. 7 is a diagram illustrating a functional configuration of an imaging apparatus.

Next, an imaging system according to a second exemplary embodiment will be described. Specifically, different points from the imaging system according to the first exemplary embodiment will be described. FIG. 7 is a diagram illustrating a functional configuration of an imaging apparatus 200 according to the second exemplary embodiment. As with the imaging apparatus 100 of the first exemplary embodiment, the imaging apparatus 200 includes an A/D conversion unit 301, a development processing unit 302, a data forming unit 303, a communication processing unit 304, a camera control unit 305, and a position processing unit 306. The imaging apparatus 200 further includes a moving processing unit 701 and a distribution order decision unit 702. The moving object processing unit 701 detects a moving object from a captured image, which is obtained by the data forming unit 303, of a fixed camera unit 102. The moving object processing unit 701 then identifies the moving amount and the moving direction of the detected moving object. The moving object processing unit 701 then generates a moving object map. The moving object map indicates a distribution of moving objects in the captured image, as well as the moving amount and the moving direction of each of the moving objects. The communication processing unit 304 transmits the moving object map to the user apparatus 110. The distribution order decision unit 702 decides a distribution order for the captured image of each of a PTZ camera unit 101 and fixed camera units 102, based on the moving object map generated by the moving object processing unit 701 or a positional relationship between the imaging range of the fixed camera unit 102, and a specified region.

Figure 8:
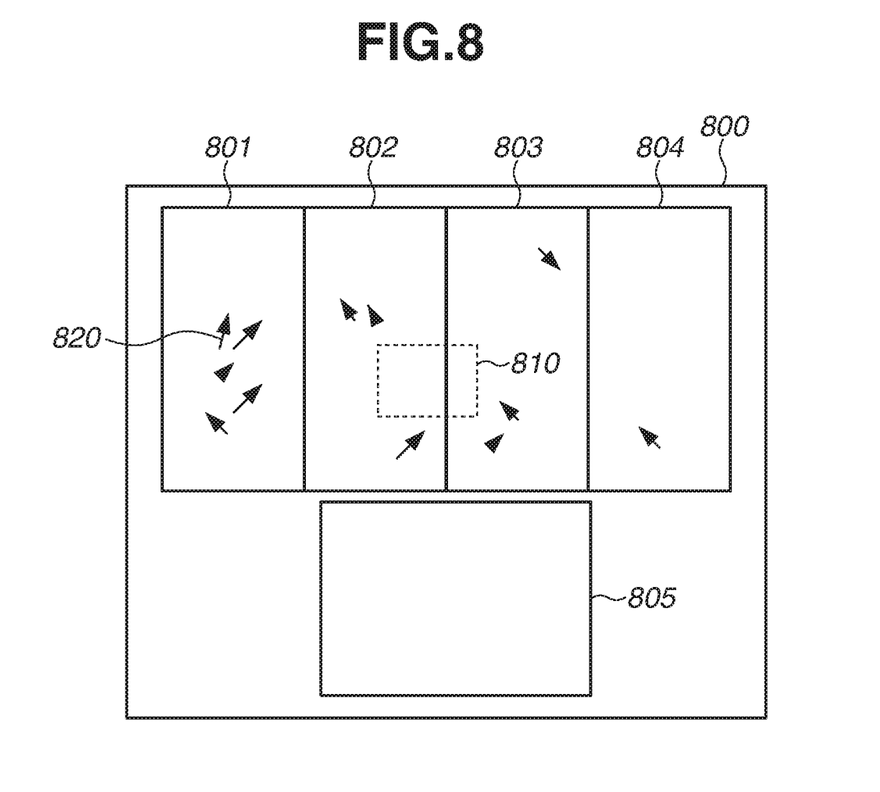
FIG. 8 is a diagram illustrating a display screen example.

FIG. 8 is a diagram illustrating a screen example displayed at a display unit 112 of a user apparatus 110 according to the second exemplary embodiment. A display screen 800 displays images captured by fixed camera units A to D in four consecutive regions 801 to 804, as with the display screen 400 (FIG. 4). The captured images in the respective four regions 801 to 804 form a continuous image as a whole. A specification frame 810 is displayed in the regions 801 to 804, according to a user operation. Further, an image captured by the PTZ camera unit 101 is displayed in a region 805.

Further, the user apparatus 110 according to the second exemplary embodiment receives the moving object map from the imaging apparatus 200. Based on the moving object map, the user apparatus 110 superimposes and renders an arrow image 820 on the captured image displayed in each of the regions 801 to 804. The arrow image 820 indicates each of the moving objects. A user can thereby recognize the distribution of the moving objects in an omnidirectional image. For example, in the example in FIG. 8, it is possible to determine that many moving objects are present in the imaging region displayed in the region 801, whereas fewer moving objects are present in the imaging region displayed in the region 804. The length of the arrow representing each of the arrow images 820 indicates the moving amount of the moving object, and the direction of the arrow indicates the moving direction the moving object.

Figure 9:
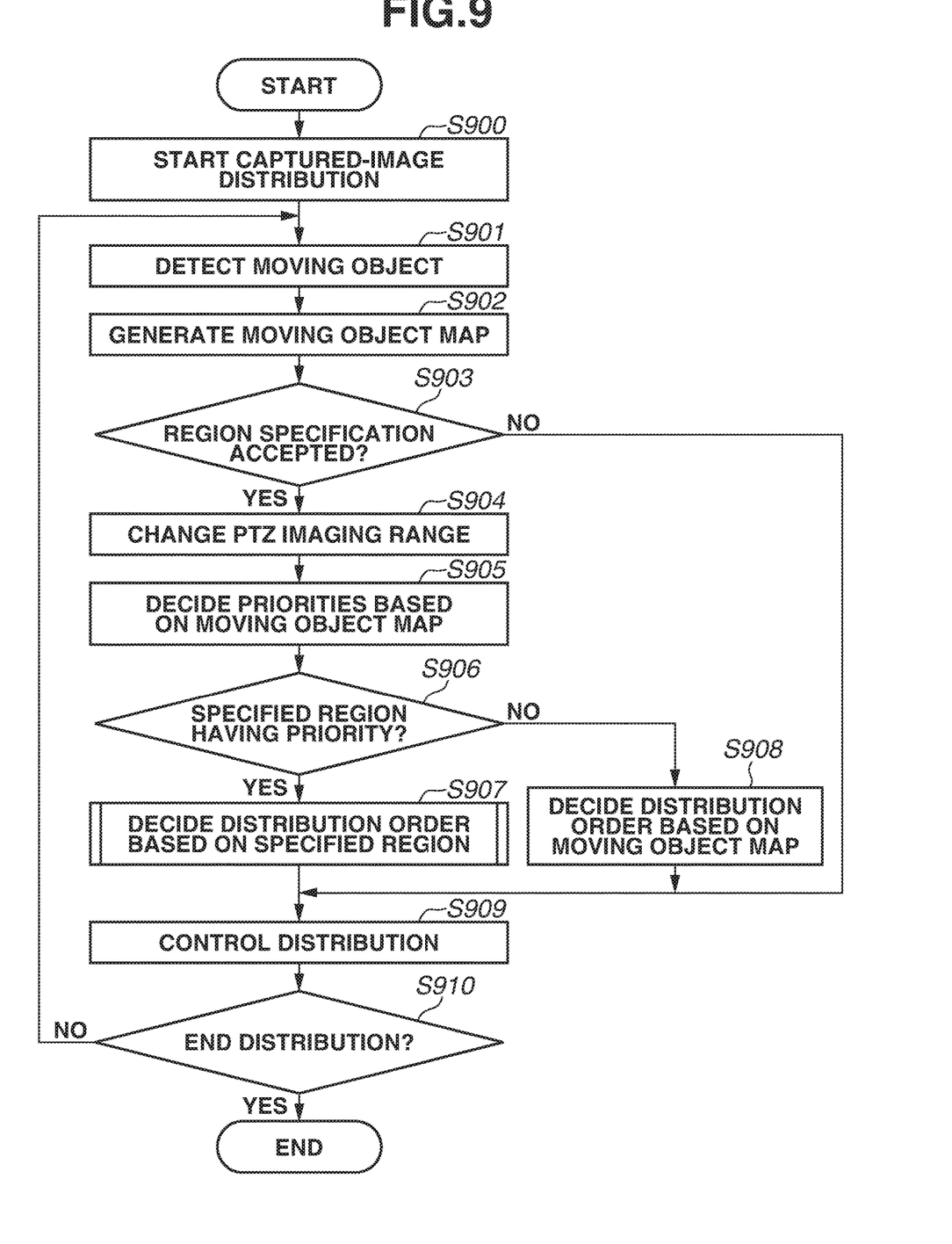
FIG. 9 is a flowchart illustrating distribution processing.

FIG. 9 is a flowchart illustrating distribution processing by the user apparatus 110 according to the second exemplary embodiment. In step S900, the communication processing unit 304 of the imaging apparatus 200 starts distributing images obtained by the PTZ camera unit 101 and the fixed camera units 102, via a communication unit 104. This step is similar to step S500 described with reference to FIG. 5. Next, in step S901, the moving object processing unit 701 detects a moving object, based on each of the images captured by the fixed camera units 102 (the fixed camera units A to D). Next, in step S902, the moving object processing unit 701 generates a moving object map, based on a result of detecting the moving object. The communication processing unit 304 then transmits the moving object map to the user apparatus 110. Accordingly, based on the received moving object map, the user apparatus 110 superimposes and displays an arrow image indicating the moving object on the captured image, as illustrated in FIG. 8.

Next, in step S903, the communication processing unit 304 confirms whether the specification of a region within an imaging range of the fixed camera unit 102 is accepted. This step is similar to step S501 (FIG. 5). When the communication processing unit 304 determines that the specification of a region is accepted (YES in step S903), the processing proceeds to step S904. When the communication processing unit 304 determines that the specification of a region is not accepted (NO in step S903), the processing proceeds to step S909. In step S904, the camera control unit 305 changes a PTZ imaging range, based on a control command corresponding to the specified region. This step is similar to step S502 (FIG. 5). Next, in step S905, the distribution order decision unit 702 decides priorities of the fixed camera units A to D, based on the moving object map generated by the moving object processing unit 701. Specifically, the distribution order decision unit 702 assigns priorities in such a manner that the larger the number of moving objects present in an imaging range is, the higher the priority is.

Next, in step S906, the distribution order decision unit 702 identifies setting about the decision of a distribution order. Here, the setting is to set which one of the specified region and the moving object has priority in deciding the distribution order. Which one has priority is set in the imaging apparatus 200 according to a user operation. If the distribution order decision unit 702 determines that the setting indicates the specified region having priority (YES in step S906), the processing proceeds to step S907. If the distribution order decision unit 702 determines that the setting indicates the moving object map having priority (NO in step S906), the processing proceeds to step S908.

In step S907, the distribution order decision unit 702 decides a distribution order based on the specified region. Specifically, the distribution order decision unit 702 decides the distribution order in a manner similar the distribution order decision processing (step S503) described in the first exemplary embodiment. On the other hand, in step S908, the distribution order decision unit 702 decides a distribution order based on the moving object map. Specifically, the distribution order decision unit 702 decides the priorities decided in step S905, as the distribution order. In other words, the distribution order decision unit 702 decides the distribution order in such a manner that a captured image including a larger number at moving objects is distributed prior to a captured image with a fewer number of moving objects. This is an example of processing for deciding a distribution order according to a result of detecting a moving object. After step S907 and step S908, the processing proceeds to step S909.

In step S909, in a case where the distribution order is decided in step S907 or step 908, the communication processing unit 304 controls a switching unit 103 to sequentially distribute the image captured by each of the PTZ camera unit 101 and the fixed camera units 102 in the decided distribution order. In a case where the distribution order is not decided, the communication processing unit 304 performs control to distribute the captured images according to a default distribution order. Next, in step S910, the communication processing unit 304 determines whether to end the distribution. If the communication processing unit 304 determines to end the distribution (YES in step S910), the distribution processing ends. If the communication processing unit 304 determines not to end the distribution (NO in step S910), the processing proceeds to step S901 to continue the distribution. The captured images are sequentially transmitted to the user apparatus 110 by the above-described processing. Hence, video images according to the distribution order are displayed and updated in the display screen 800. Further, the arrow images are displayed and updated according to the moving object map.

For example, assume that the specified region has priority in the example in FIG. 8. In this case, the distribution order is decided by the above-described processing in such a manner that the PTZ camera unit 101, the fixed camera unit B corresponding to the region 802, the fixed camera unit C corresponding to the region 803, the fixed camera unit A corresponding to the region 801, and the fixed camera unit D corresponding to the region 804 are arranged in this order.

Alternatively, assume that the moving object map has priority in the example in FIG. 8. In this case, the distribution order is decided in such a manner that the PTZ camera unit 101, the fixed camera unit A, the fixed camera unit B, the fixed camera unit C, and the fixed camera unit D are arranged in this order. Other configuration and processing of the imaging system according to the second exemplary embodiment are similar to those of the imaging system according to the first exemplary embodiment.

As described above, the imaging apparatus 200 of the second exemplary embodiment can perform distribution control for giving a higher priority to either the moving object map or the specified region.

Some exemplary embodiments of the present invention have been described above. However, the present invention is not limited to these specific exemplary embodiments, and may be variously altered and/or modified within the scope of the gist of the present invention described in the claims.

Other Exemplary Embodiments

A program for implementing one or more functions of the above-described exemplary embodiments may be supplied to a system or an apparatus via a network or a storage medium. One or more processors in a computer of the system or the apparatus may execute processing reading the program. The present invention can also be implemented by this processing. The present invention can also be implemented by a circuit (e.g., an application-specific integrated circuit (ASIC)) for implementing one or more functions.

According to an exemplary embodiment of the present invention, it is possible to appropriately distribute an image captured by a camera having a fixed imaging range and an image captured by a camera capable of changing an imaging range.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc. (BD)™), a flash memory device, a memory card, and the like.

While the present invention has been described with reference to exemplary embodiments, it is to be understood that the invention is not limited to the disclosed exemplary embodiments. The scope of the following claims is to be accorded broadest interpretation so as to encompass all such modifications and equivalent structures and functions.

This application claims the benefit of Japanese Patent Application No. 2017-176622, filed Sep. 14, 2017, which is hereby incorporated by reference herein in its entirety.

What is claimed is:

1. An imaging apparatus comprising:
a plurality of first imaging units configured to capture a plurality of first images corresponding to a plurality of positions to be captured, the plurality of positions being different from each other, the plurality of first images being combined in an external apparatus and to be displayed in a first area in a display screen;
an accepting unit configured to accept specification of a position overlapping at least one of the plurality of positions;
a second imaging unit configured to be capable of changing a position to be captured, the second imaging unit being configured to capture a second image corresponding to the specified position specified by the specification in response to the specification, the second image to be displayed in a second area in the display screen, and the second area being different from the first area; and
a distribution unit configured to distribute, in order of distribution, to the external apparatus at least the plurality of first images,
wherein the distribution unit changes the order of distribution and distributes to the external apparatus the plurality of first images in the changed order of distribution, in response to the specification accepted by the accepting unit.

2. The imaging apparatus according to claim 1, further comprising a decision unit configured to decide the order of distribution of the plurality of first images, based on a positional relationship between the plurality of positions to be captured and the specified position.

3. The imaging apparatus according to claim 2, wherein the decision unit decides the order of distribution, based on whether the specified position overlaps with the position to be captured.

4. The imaging apparatus according to claim 2, wherein the decision unit decides the order of distribution, according to an area of an overlap between the position to be captured and the specified position.

5. The imaging apparatus according to claim 1, wherein the distribution unit distributes to the external apparatus the second image prior to the plurality of first images.

6. The imaging apparatus according to claim 1, further comprising a moving object detection unit configured to detect a moving object, in each of the plurality of first images, and
a decision unit configured to decide the order of distribution of the plurality of first images, based on a result of detecting the moving object by the moving objection detection unit.

7. A control method for an imaging apparatus, the control method comprising:
capturing a plurality of first images corresponding to a plurality of positions to be captured, the plurality of positions being different from each other, the plurality of first images being combined in an external apparatus and to be displayed in a first area in a display screen;
accepting specification of a position overlapping at least one of the plurality of positions;
changing a position to be captured and capturing a second image corresponding to the specified position in response to the specification, the second image being displayed in a second area in the display screen, and the second area being different from the first area; and
distributing, in order of distribution, to the external apparatus at least the plurality of first images,
wherein the distribution changes the order of distribution and distributes to the external apparatus the plurality of first images in the changed order of distribution, in response to the accepted specification.

8. A non-transitory computer readable storage medium storing a program for causing a computer to execute:
capturing a plurality of first images corresponding to a plurality of positions to be captured, the plurality of positions being different from each other, the plurality of first images being combined in an external apparatus and to be displayed in a first area in a display screen;
accepting specification of a position overlapping at least one of the plurality of positions;
changing a position to be captured and capturing a second image corresponding to the specified position, the second image to be displayed in a second area in the display screen, and the second area being different from the first area; and
distributing, in order of distribution, to the external apparatus at least the plurality of first images,
wherein the distribution changes the order of distribution and distributes to the external apparatus the plurality of first images in the changed order of distribution, in response to the accepted specification.

* * * * *